United States Patent Office 3,159,737
Patented Dec. 1, 1964

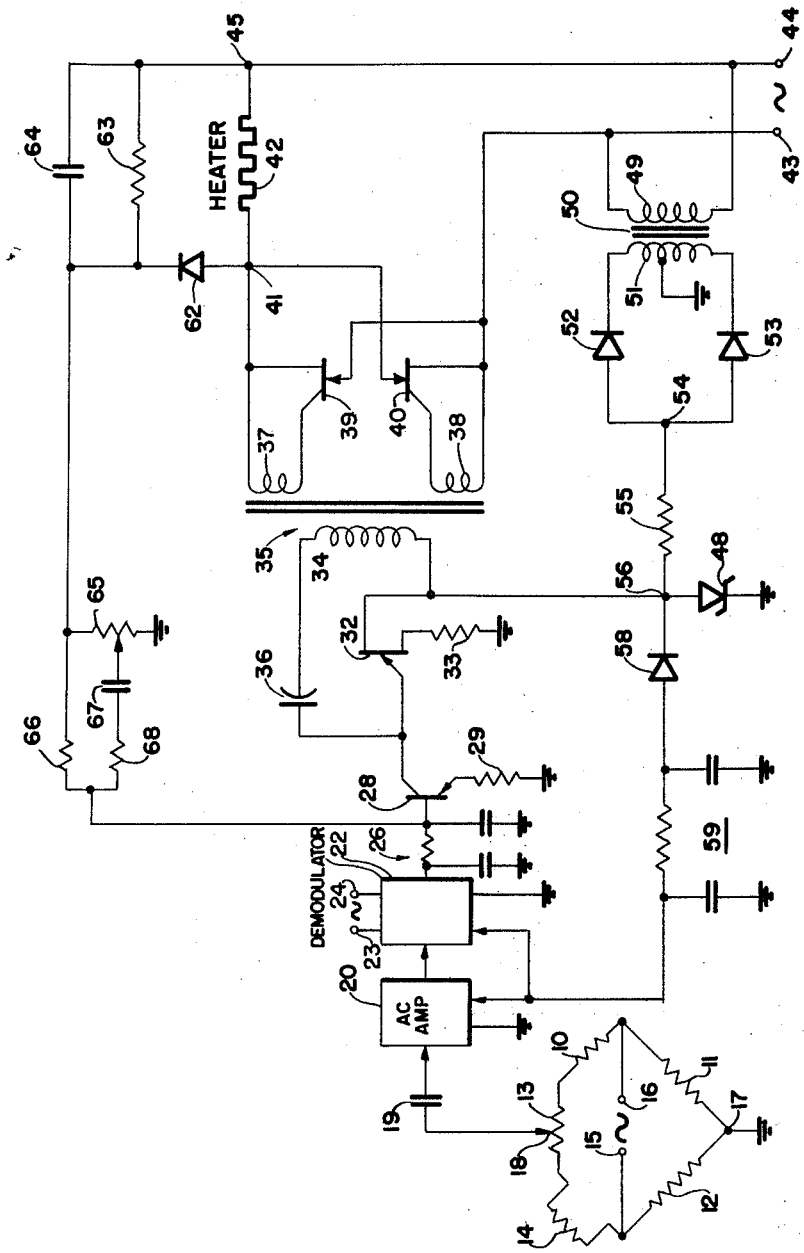

3,159,737
TEMPERATURE CONTROLLER
Ralph A. Dorn, Anaheim, Calif., assignor to Beckman Instruments, Inc., a corporation of California
Filed May 17, 1962, Ser. No. 195,636
7 Claims. (Cl. 219—501)

This invention relates to a temperature controller and more particularly to a chromatographic analyzer temperature controller utilizing rate feedback to achieve stability under high loop gain conditions.

The present invention is applicable to chromatographic analyzers wherein precise temperature control of a chromatographic column and/or associated measuring equipment is essential. A chromatographic analyzer is used in determining the identity and proportions of the components of a gas or fluid mixture. In a typical instrument, a carrier gas is continuously passed through a chamber or column which is packed with a granular material having particularl absorption characteristics or which is coated with a liquid having particular gas solubility characteristics. A small quantity of the sample to be analyzed is introduced into the carrier ahead of the column at a noted time. The various components of the sample are separated within the column and exit at different times, the elapsed time being an indication of the identity of the component. The presence and proportion of the various components in the exit carrier gas are detected by conventional means, such as by a thermal conductivity cell.

A factor affecting the stability of a chromatographic analyzer is temperature. Generally, the column and the detecting means are mounted within a thermally insulated container. Also mounted within the container is a heating device for maintaining the temperature constant, and this device is controlled by signals supplied from a temperature sensing device located within the chamber. There have been many types of electronic temperature controllers which provide to the heater an output which is proportional to the system error signal derived from the temperature sensing device. Some systems approach true proportional output by pulsing the voltage applied to the heater at a rate proportional to the error signal, utilizing the system mass (gas, liquid, etc.) to integrate these pulses. Other systems employ a fixed output heater and pulse a smaller heater for control, gaining stability by loss of loop gain.

Proportional controllers using power transistors, servoed variacs, saturable core reactors, etc., are employed, but are often limited by maximum wattage ratings and speed of response. Control of temperature in a chromatographic analyzer is difficult because of the desired wide selection of column operating temperatures, the required close control of temperature at every temperature setting, and the necessity of maintaining temperature gradients at a minimum. Furthermore, the temperature control band characteristic of conventional on-off type systems is objectionable because the temperature excursions are reflected as zero instability in the instrument. In a close loop temperature control system, the gain must be high in order to maintain close temperature control. High gain may be used if all elements in the loop are stable, but under actual operating conditions spurious signals from temperature gradients from within the gas or liquid baths and line voltage fluctuations cause a high gain system to oscillate.

Accordingly, the present invention provides a temperature controller for a chromatographic analyzer employing a rate feedback system in which high gain is provided without the instability normally associated with high gain proportional controllers.

Another feature of the present invention is the provision of 100% proportional band temperature controller for chromatographic analyzers in which a rate feedback system is employed to differentiate a negative feedback voltage thereby producing high negative feedback during controller transients and a minimum or zero feedback under stable conditions.

An additional feature of the present invention is the provision of a proportional band temperature controller employing solid state components for controlling the bath temperature in a chromatographic analyzer, and employing rate feedback for producing low gain during controller transients and a high gain during stable operating conditions.

A temperature control system constructed in accordance with the teachings of the present invention includes a sensing element, a controller, a heater and a mass or bath to be controlled. The sensing element detects the temperature of the controlled mass and supplies a signal to the controller which in turn controls the heater to control the temperature of the controlled mass. The voltage applied to the heater is rectified, filtered and used as a negative feedback within the controller. The feedback is applied through a fixed feedback resistance and a voltage differentiating RC network which produces a high negative feedback during controller transients and a minimum or zero feedback under stable operating conditions. The rate feedback time constant may be selected longer than is necessary, and the final adjustment made with a voltage divider potentiometer.

Other features and objects of the invention will be better understood from a consideration of the following detailed description when read in conjunction with the attached drawing which illustrates a chromatographic analyzer temperature controller constructed in accordance with the teachings of the present invention.

The gain must be high in a closed loop temperature control system in order to maintain close temperature control. As noted previously, high gain may be employed if all elements in the loop are stable, but under actual operating conditions suprious signals from temperature gradients and line voltage fluctuations cause a high gain system to oscillate. The mass or bath to be heated and controlled usually is well fixed by the number and size of the components that must be included. Once the mass is fixed, the maximum controllable temperature and the rate at which this temperature may be reached dictates the heater power required.

With the mass and heater selected, the system is capable of being heated or cooled at known rates. Controller signals which occur at a rate faster than the mass or bath is capable of being heated or cooled may be considered to be spurious signals. Also, there are other time constants in the system, such as the time for the heater voltage change to be reflected as a bath temperature change and the time for a change in container temperature to be detected by the temperature sensing element. These latter time constants are much shorter than that of the bath itself.

The output wattage of a controller may only be increased by increasing the error signal. Therefore, a decrease in ambient temperature will cause a higher wattage demand which only can be supplied by a higher error signal. This higher signal can only be achieved by a change in the system temperature set point. This change in set point with change in demand is called proportional offset. This offset may be eliminated by reset action, which essentially maintains the error signal at a fixed value, or may be greatly reduced by increasing the loop gain as high as loop stability will allow.

High loop gains are possible if all elements in the loop remain stable, but generally enough spurious error signals are generated to cause system oscillation. According to the present invention, it has been found that these spurious signals are of a higher frequency than the system time constants, and that these signals can be effectively eliminated by rate feedback. An electrical rate feedback system is composed of resistance and capacitance and functions to allow high loop gain under stable conditions and to reduce loop gain during periods of transient error signals.

The present invention provides a temperature controller for chromatographic analyzers which allows accurate control of bath temperatures over a wide range of temperature set points, ambient temperatures and line voltages. The system includes a Wheatstone bridge sensing arrangement using a resistance thermometer, an A.C. amplifier, a demodulator, a D.C. amplifier, and a silicon controlled rectifier arrangement controlled from a unijunction transistor and pulse transformer. The silicon controlled rectifiers provide a voltage which is applied to the heater to control the mass or bath temperature. The heater voltage is rectified, filtered and employed as a negative feedback to the input of the D. C. amplifier through a fixed feedback resistance and a voltage differentiating RC network. The RC network produces high negative feedback during controller transients and a minimum or zero feedback under stable conditions. This system allows an electronic temperature controller for a chromatographic analyzer to be operated at high gain while still maintaining stability. By the proper selection of the rate feedback circuit components, the temperature controller may be applied to any chromatographic analyzer temperature control system. However, the selection of the rate feedback circuit components is not critical because the time constants of the controller, heater, and sensing elements are much shorter than the bath time constant.

Referring now to the drawing, a Wheatstone sensing bridge includes three resistances 10, 11 and 12, a variable set point resistance 13 and a resistance thermometer 14. The resistance thermometer 14 may be a wire-wound resistance. A suitable resistance thermometer may have a resistance of 150 ohms at 40° centigrade. The resistance thermometer 14 generally is located near the chromatographic analyzer column. Reference may be made to copending U.S. patent application Serial Number 654,158, filed April 22, 1957, now Patent No. 3,062,037, for a detailed description of a chromatographic analyzer and the manner in which the column, detector, temperature sensing device and container heating device are arranged. By way of example only, a suitable set point resistance may provide a temperature span of 40° centigrade to 240° centigrade. A constant A.C. voltage is applied to terminals 15 and 16 of the bridge. A suitable A.C. input voltage to the bridge may be on the order of two volts. The selection of the bridge voltage must be compromised between gain and self-heating error. Line voltage fluctuations can cause errors if the bridge voltage is high enough to cause appreciable self-heating of the resistance thermometer. A lower terminal 17 of the bridge is grounded, and a variable tap 18 on the set point resistance 13 is connected through a capacitance 19 to an A.C. amplifier 20.

The A.C. amplifier 20 may be a three stage transistorized amplifier. This amplifier may include a gain control potentiometer which controls the proportional band, if desired. Resistances may be provided within the amplifier to allow the gain control to be calibrated for a preselected range of proportional bands. The output of the amplifier 20 is applied to a demodulator 22. Input terminals 23 and 24 connected to the demodulator 22 supply an A.C. voltage thereto. The demodulator 22 may include a pair of transistors which are triggered by the A.C. voltage applied to the terminals 23 and 24. The A.C. voltage applied to the terminals 23 and 24 may be derived from the same source, for example a transformer, as the voltage applied to the terminals 15 and 16 of the Wheatstone bridge. The voltage applied to the terminals 23 and 24 may be, for example, 12 volts A.C.

The output from the demodulator 22 is filtered by a filter 26 and applied to the base of a D.C. amplifier transistor 28. The emitter of the transistor 28 is connected through a resistance 29 to ground. The collector of the transistor 28 is connected to the emitter of a unijunction transistor 32. One base of the unijunction transistor 32 is connected through a resistance 33 to ground. A second base of the unijunction transistor 32 is connected through a primary winding 34 of a pulse transformer 35 and a capacitor 36 back to the emitter of the unijunction transistor. The unijunction transistor 32 pulses the pulse transformer primary 34 at a rate proportional to the D.C. signal from the transistor 28.

The pulse transformer 35 includes a pair of secondaries 37 and 38 connected to control respective silicon controlled rectifiers 39 and 40. The secondary winding 37 is connected from the gate to the cathode of the rectifier 39, the cathode being connected to a terminal 41 of a heater 42. The terminal 41 is connected to the anode of the rectifier 40. The gate and cathode of the rectifier 40 are connected across the secondary winding 38, the cathode being connected to a terminal 43 of an A.C. voltage source. The terminal 43 also is connected to the anode of the rectifier 39. A terminal 44 of the A.C. voltage source is connected to a second terminal 45 of the heater 42. An A.C. voltage, such as normal line voltage, is applied to the A.C. voltage terminals 43 and 44. The heater 42 may be located in the container in which is situated the column and the detector of the chromatographic analyzer.

The phasing between the line voltage applied to the terminals 43 and 44 and the pulse circuit including the unijunction transistor 32 and the transformer 35 is controlled by a dual purpose zener diode 48. A primary winding 49 of a transformer 50 is connected across the voltage source terminals 43 and 44. A secondary winding 51 on the transformer 50 has a center tap 52 connected to ground, and terminals connected through diodes 52 and 53 to a terminal 54. The terminal 54 is connected through a resistance 55 to a terminal 56. The zener diode 48 is connected between the terminal 56 and ground, and the terminal 56 is connected to the junction of the first base of the unijunction transistor 32 and the primary winding 34 of the transformer 35.

The transformer 50, diodes 52 and 53, and the resistance 55 function to supply a rectified voltage to the terminal 56. The zener diode 48 clips the rectified voltage appearing at the terminal 56 to furnish an accurate line voltage synchronizing pulse to the unijunction transistor 32. The terminal 56 is connected through a diode 58 and a filter network 59 to the amplifier 20. The zener diode 48 additionally functions in conjunction with the diode 58 and the filter network 59 to regulate the supply voltage applied to the A.C. amplifier 20.

At the start of a half cycle of the line voltage, the capacitor 36 is discharged by the synchronizing voltage on the terminal 56 dropping to zero. During the half cycle the unijunction transistor 32 pulses at a rate proportional to the D.C. error signal supplied from the transistor 28. The first pulse supplied through the transformer 35 triggers the properly phased silicon controlled rectifier 39 or 40 which then, in turn, locks itself into conduction for the remainder of the half cycle. On the next half cycle, the alternate silicon controlled rectifier 40 or 39 is triggered into conduction. This arrangement allows conduction from complete cut-off to around 175°.

A diode 62 is connected with the terminal 41. A resistance 63 is connected with the diode 62 and the heater terminal 45. A capacitor 64 is connected in parallel with the resistance 63. The voltage applied to the heater 42 is rectified and filtered to provide a negative D.C. feedback voltage. This voltage is fed to a potentiometer 65 which is connected between the junction of the diode 62, the resistance 63, and the capacitance 64, and ground. The negative feedback voltage also is applied through a resistance 66 to the base of the transistor 28. A capacitance 67 and a resistance 68 are connected from a variable tap on the potentiometer 65 to the base of the transistor 28. The resistance 66 aids in obtaining a linear D.C. input to A.C. output relationship.

The potentiometer 65, capacitance 67 and resistance 68 constitute the rate feedback circuit, and the potentiometer 65 may be adjusted to vary the amount of rate feedback. As noted previously, the rate feedback circuit serves to differentiate the negative feedback voltage thereby producing high negative feedback during transients and a minimum of zero feedback under stable conditions. The resistance 66 must have a value high enough to avoid cancelling the effect of the rate feedback resistance 68. The capacitance 67 and resistance 68 may be roughly selected and then finally adjusted with the potentiometer 65. The adjustment usually is not critical as long as the time constant of the rate feedback circuit is longer than that of either the heater or the sensing thermometer and shorter than that of the bath.

It now should be apparent that the present invention provides a proportional band temperature controller for a chromatographic analyzer. The controller includes a sensing thermometer and heater located in or close to the mass or bath of the chromatographic analyzer whose temperature is being controlled, and a controller. A Wheatstone bridge sensing system includes the sensing thermometer, and the output of the bridge is connected through an A.C. amplifier, demodulator, and D.C. amplifier to control a unijunction transistor. The unijunction transistor functions in connection with a capictance, a transformer and a synchronizing source to control a pair of silicon controlled rectifiers. The rectifiers are connected with the heater to supply a variable voltage thereto. The voltage applied to the heater is rectified, filtered and used as a negative feedback to the input of the D.C. amplifier. The rectified and filtered feedback also is applied through a rate feedback circuit which serves to differentiate the negative feedback voltage, thereby producing high negative feedback during controller transients and a minimum of zero feedback under stable conditions.

It will be understood that although an exemplary embodiment of the present invention has been disclosed and discussed, other applications and circuit arrangements are possible and that the embodiment disclosed may be subjected to various changes, modifications, and substitutions without necessarily departing from the spirit of the invention.

What is claimed is:

1. A chromatographic analyzer including a container in which certain of the components thereof are situated, a heating device located in said container to control the temperature thereof, a temperature sensing means located in said container to sense the temperature thereof, an electronic controller connected with said temperature sensing means and said heating device to control the output of the heating device in response to signals from said temperature sensing device, the improvment comprising
    an amplifier,
    first means connecting the temperature sensing means with said amplifier,
    a pulse circuit,
    means connecting the amplifier to control the pulse rate of said pulse circuit,
    means coupled with a source of voltage for applying synchronizing pulses to said pulse circuit,
    rectifier means,
    means connecting said rectifier means to said pulse circuit and to said source of voltage whereby said pulse circuit controls the operation of said rectifier means to provide a variable output voltage,
    means connecting said rectifier means with said heating device to apply said variable voltage to said heating device,
    a negative feedback circuit including an impedance connected with said heating device and said amplifier, and
    said feedback circuit further including a differentiating circuit having a reactive component coupled with said impedance, said differentiating circuit operating to differentiate the voltage fed back to said amplifier by said feedback circuit thereby producing low gain during controller transients and high gain when the controller operation is stable.

2. A device as in claim 1 wherein
    said feedback circuit includes means to rectify and filter the voltage applied to the heating device to provide a negative feedback voltage,
    said differentiating circuit includes a potentiometer, capacitance and resistance with the capacitance and resistance being connected in series with a variable tap on said potentiometer, and
    said feedback circuit includes means for applying said negative feedback voltage to said potentiometer.

3. A temperature controller for a chromatographic analyzer which includes a container in which the temperature is to be controlled, a heater located in said chamber for controlling said temperature, a temperature sensing device located in said chamber for indicating temperature within said chamber, said temperature sensing device being connected in a Wheatstone bridge arrangement to provide output signals indicative of temperature variations within said chamber, first means for amplifying and demodulating said signals, the improvement comprising
    second means connected with said first means and responsive to the demodulated signals to provide control pulses,
    a voltage source,
    third means connected with said second means, said voltage source and said heater and responsive to pulses from said second means to control the voltage applied to said heater,
    a negative feedback circuit including a resistor connected with said heater and said second means to apply negative feedback signals to said second means, and
    impedance means including resistive and capacitive components coupled with said resistor in said feedback circuit for differentiating said negative feedback signals to produce a high negative feedback during controller transients and a minimum negative feedback during stable operation of said controller.

4. A high loop gain temperature controller for a chromatographic analyzer which includes a container in which the temperature is to be controlled, a heat exchanger connected with said chamber for controlling said temperature, a temperature sensing device being arranged with said chamber to provide output signals indicative of temperature variations of said chamber, the improvement comprising
    first means responsive to said output signals to provide control signals,
    a power source, synchronizing means coupled with said power source and said first means,
    second means coupled with said first means, said power source and said heat exchanger and responsive to said control signals from said first means to control said heat exchanger,
    a feedback circuit connected with said heat exchanger and said first means to apply feedback signals to said first means,
    a differentiating circuit connected in said feedback circuit for differentiating said feedback signals to produce a high feedback during controller transients and a minimum feedback during stable operation of said controller, said differentiating circuit including resistance, capacitance and a potentiometer, with said capacitance and resistance being connected in series with a variable tap on said potentiometer, and said feedback circuit includes means for applying said feedback signals to said potentiometer.

5. A high loop gain temperature controller for a chromatographic analyzer in which the temperature is to be controlled, a heat exchanger connected with said analyzer for controlling said temperature, a temperature sensing device connected with said analyzer to provide output signals indicative of temperature variations of said analyzer, the improvement comprising means connected with said temperature sensing device and responsive to said output signals therefrom to provide control pulses, second means connected with said first means, said heat exchanger and a source of voltage, and responsive to pulses from said first means to control the operation of said heat exchanger, a negative feedback circuit connected with said heat exchanger and said first means to apply negative feedback signals to said first means, said feedback circuit including a resistor, and a differentiating circuit including resistance and capacitance connected with said resistor and connected in said feedback circuit for producing a high negative feedback during controller transients and a minimum negative feedback during stable operation of said controller.

6. A temperature controller for a chromatographic analyzer in which the temperature is to be controlled, a heat exchanger connected with said analyzer for controlling said temperature, a temperature sensing device connected with said analyzer for sensing the temperature thereof, said temperature sensing device being connected in a Wheatstone bridge which provides output signals indicative of temperature variations of said analyzer, an amplifier connected with said Wheatstone bridge for amplifying said output signals, a demodulator connected with said amplifier for demodulating the amplified output signals, the improvement comprising a D.C. amplifier connected with said demodulator for amplifying the demodulated output thereof and providing output signals, a control pulse generator connected with said D.C. amplifier and controlled by signals from said D.C. amplifier to provide control pulses, synchronizing means connected with a source of voltage and said control pulse generator for synchronizing the operation of said control pulse generator with the said source of voltage, rectifier means connected with said control pulse generator and said source of voltage, and responsive to said control pulses from said control pulse generator for providing a variable output voltage, a heater connected with said rectifier means and controlled by said variable output voltage of said rectifier means, rectifying and filtering means connected with said heater to rectify and filter said variable voltage to provide a negative feedback signal, and a rate feedback circuit including interconnected capacitance and resistance for differentiating the negative feedback signal and applying a high negative feedback signal to said D.C. amplifier during controller transients and applying a low negative feedback signal to said D.C. amplifier during stable operating conditions of said controller.

7. A temperature controller as in claim 6 wherein said control pulse generator includes a unijunction transistor interconnected with a capacitance and a transformer, said rectifying means includes a pair of silicon controlled rectifiers connected with transformer, said source of voltage and said heater, and said rate feedback circuit includes a potentiometer, capacitance and resistance, with the capacitance and resistance being connected in series with a variable tap on said potentiometer.

References Cited by the Examiner

UNITED STATES PATENTS

| | | | |
|---|---|---|---|
| 2,251,973 | 8/41 | Beale et al. | 328—127 |
| 2,436,891 | 3/48 | Higinbotham | 328—127 |
| 2,828,450 | 5/55 | Pinckaers | 317—148.5 |
| 3,040,157 | 6/62 | Hukee | 219—498 |
| 3,062,037 | 11/62 | Donner et al. | 73—23.1 |
| 3,114,025 | 12/63 | Blauvelt et al. | 219—501 X |

RICHARD M. WOOD, *Primary Examiner.*